United States Patent [19]

Davis et al.

[11] Patent Number: 4,871,974

[45] Date of Patent: Oct. 3, 1989

[54] COHERENT PHASE SHIFT KEYED DEMODULATOR

[75] Inventors: Gordon T. Davis; Baiju D. Mandalia, both of Boca Raton, Fla.

[73] Assignee: International Business Machines, Corp., Armonk, N.Y.

[21] Appl. No.: 289,064

[22] Filed: Dec. 23, 1988

[51] Int. Cl.[4] .......................... H03D 3/18; H03K 9/04
[52] U.S. Cl. ..................................... 329/345; 329/304; 375/81; 375/82; 375/85; 375/97
[58] Field of Search ................. 329/50, 107, 122, 124, 329/126; 375/80, 81, 82, 83, 84, 85, 86, 87, 97; 455/214, 337

[56] References Cited

U.S. PATENT DOCUMENTS

| | | | |
|---|---|---|---|
| 3,924,188 | 12/1975 | Hofbauer | 375/10 |
| 3,970,945 | 7/1976 | Knapp | 329/104 |
| 4,100,499 | 7/1978 | Monrolin | 329/50 |
| 4,206,320 | 6/1980 | Keasler et al. | 370/11 |
| 4,224,575 | 9/1980 | Mosley et al. | 329/50 |
| 4,246,654 | 1/1981 | Malm | 375/82 |
| 4,313,205 | 1/1982 | Rhodes | 375/86 |
| 4,328,587 | 5/1982 | Mizuno et al. | 375/97 |
| 4,379,266 | 4/1983 | Rubin | 329/104 |
| 4,397,039 | 8/1983 | McAuliffe | 455/202 |
| 4,409,562 | 10/1983 | Kurihara | 331/1 A |
| 4,423,390 | 12/1983 | Waters | 331/4 |
| 4,457,005 | 6/1984 | Burke et al. | 375/82 |
| 4,461,014 | 7/1984 | Fujino | 375/83 |
| 4,466,108 | 8/1984 | Rhodes | 375/83 |
| 4,475,218 | 10/1984 | Takeda et al. | 375/81 |
| 4,507,617 | 3/1985 | Sasaki | 329/50 |
| 4,670,887 | 6/1987 | Heatherington | 375/84 |
| 4,712,221 | 12/1987 | Pearce et al. | 375/14 |
| 4,740,997 | 4/1988 | Heatherington | 375/82 |

Primary Examiner—David Mis

[57] ABSTRACT

A demodulator mechanism which uses estimates of the in-phase and quadrature-phase components of differential phase modulated carrier signals for performing a coherent demodulation of these signals is described. The instantaneous estimates, obtained from an estimator circuit, are fed into a differential carrier recovery circuit, which provides for a feedback of ideal sine and cosine components, and combined with the instantaneous estimates for incrementally decreasing a phase error signal generated in a computational circuit. By thus incrementally decreasing the phase error signal, an ideal phase angle is eventually obtained, thereby providing for coherent demodulated output components of the input carrier signals.

22 Claims, 5 Drawing Sheets

| BIT 1 | BIT 2 | Δφ | u | v |
|---|---|---|---|---|
| 1 | 1 | 0° | +1 | +1 |
| 0 | 1 | +90° | −1 | +1 |
| 1 | 0 | −90° | +1 | −1 |
| 0 | 0 | 180° | −1 | −1 |

COHERENT PHASE SHIFT KEYED DEMODULATOR

Field of the Invention

The present invention relates to apparatus for demodulating phase modulated carrier signals, and, although not limited thereto, particularly to modems for transmitting and receiving digital data via communications network such as telephone networks.

BACKGROUND OF THE INVENTION

Copending application Ser. No. 214,250 filed July 1, 1988 by the applicants of the instant invention (incorporated herein by this reference) describes that one type of phase modulation data transmission systems is a differential detection system which detects transmitted data by looking at changes in the phase of the input differential phase modulated carrier signal.

Briefly, two basic methods (or systems) are known for demodulating a differential phase modulated carrier signal: a coherent method and a non-coherent method.

In the coherent method, a carrier recovery circuit is used to reconstruct in-phase and quadrature-phase reference signals which are multiplied against the received signal and a phase shifted version of the received signal. The results are then linearly combined to produce a pair of demodulated signals representing the two modulation components of the received signal. In the non-coherent demodulation method, no carrier recovery circuit is used. Instead, a delayed version of the received signal is multiplied against the received signal to produce the demodulated signal.

Non-coherent demodulation has the advantage of being simple to implement, as it does not require a carrier recovery circuit. Moreover, the input filtering is less complex since a phase splitting filter is not required to generate the complex form of the received signal. However, for the non-coherent method, typically a post detection filter is needed to eliminate double frequency terms generated by the multiplication process.

In digital signal processing (where demodulating functions are performed using digital number values obtained from a periodic sampling of the received signal) the coherent method becomes more attractive because many of the calculations can be done at the symbol or baud rate which may range from approximately 600 Hz to 2400 Hz. Digital implementation of the non-coherent method requires operations at the higher sampling rate of at least 8 KHz, for the post detection filter.

The copending '250 application discloses that estimates of the in-phase and quadrature-phase components of the input demodulated carrier signal may be used in the demodulation process for generating a socalled "pseudo-coherent" demodulator. To do this, the '250 device has the structure of a typical coherent demodulator, but does not have any carrier recovery circuits, using instead the instantaneous estimates of the input carrier signal components. These carrier estimates are obtained directly from the received carrier signal, with a delay of one baud between the calculation of the carrier estimates and their use in the demodulator, for effecting a differential phase shifted demodulated signal at the output of the demodulator.

Although this demodulator is "pseudo-coherent", the fact remains that it still is not coherent per se. Therefore, in order to obtain better signal-to-noise ratios and better modem performance, a coherent demodulator is still deemed desirable.

SUMMARY OF THE INVENTION

The present invention provides for a demodulator which uses estimates of the in-phase (or cosine) and quadrature-phase (or sine) components as inputs into a carrier recovery mechanism in order to derive the proper phase and to average out any instantaneous variations in the in-phase and quadrature-phase components, in order to obtain improved signal-to-noise ratios and to have a structure which can be switched from non-coherent to coherent signal processing.

To achieve this end, the instantaneous carrier estimates are input to a carrier recovery circuit and compared with ideal components which have pre-existing phase angles for generating a phase error signal, i.e. a phase angle deviation between the instantaneous estimates of the components and the ideal components, which then is combined with a pre-existing phase angle and a phase shift for generating a new phase angle. The newly generated phase angle is then used as an input to a sine table which, in response to the new phase angle, outputs new ideal sine and cosine components, to be fed back and compared with the phase error signal. By means of this feedback, the phase error signal is incrementally decreased, thereby eventually leading to substantially ideal sine and cosine components, which are fed to multiplier and adder means, to be recovered as a coherent demodulated carrier signal, minus any phase angle deviations.

Inasmuch as the coherent demodulator of the invention uses instantaneous estimates of the components of a sample of the input carrier signal, it, like the "pseudo-coherent" demodulator of the '250 copending application, is able to operate at the baud rate, instead of the sampling rate.

It is, therefore, an objective of the present invention to provide a coherent phase shift keyed demodulator that can be implemented simply and can sample at the baud rate.

It is another objective of the present invention to provide a coherent demodulator that has an enhanced signal-to-noise ratio and is an extension of the socalled "pseudo-coherent" demodulator.

The above-mentioned objectives and advantages of the present invention will become more apparent and the invention itself will be best understood by reference to the following description of an embodiment of the invention taken in conjunction with the accompanying drawings, wherein:

DETAILED DESCRIPTION OF THE PRESENT INVENTION

Figures 1, 2:
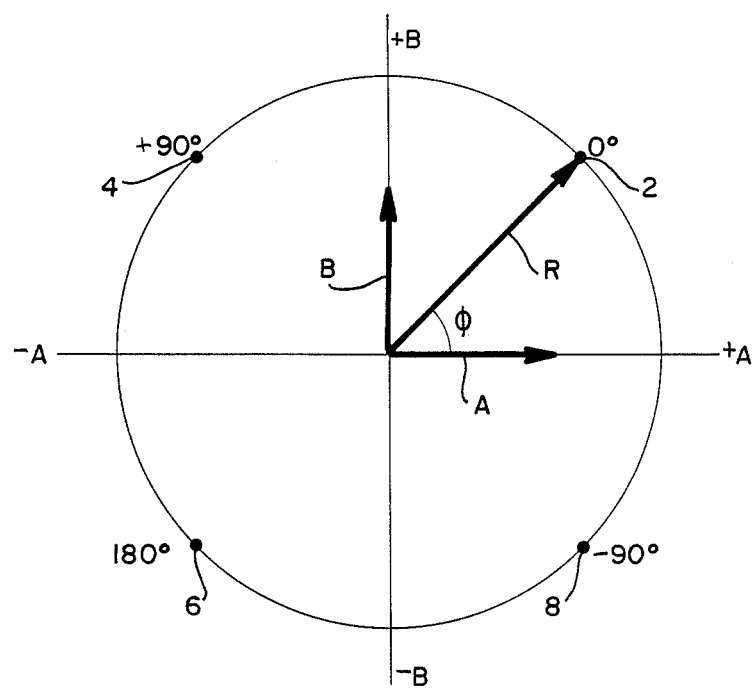
FIG. 1 is a vector diagram of a phase modulated carrier signal to be input to the demodulator of the present invention.
FIG. 2 is a chart used in conjunction with the FIG. 1 vector diagram and the demodulator of the present invention to explain the operation of the same.

Referring to FIG. 1, there is shown a vector diagram of a carrier signal R which is to be input to the demodulator of the present invention. This carrier signal is a four-phase type signal, which means that at any given moment its phase angle may be at any one of four different values. The received carrier signal R is sinusoidal in nature and may be described by the following mathematical relationship:

$$R = (A \cos \theta) + (B \sin \theta) = C \cos(\theta + \phi) \quad (1)$$

where $$\theta = 2\pi ft$$

The symbol "f" denotes the frequency of the carrier signal and "t" denotes time.

With reference to FIG. 1, it can be seen that the outer end of vector R may be located at any one of four points 2, 4, 6 and 8, at any given instant that $\theta$ is a multiple of $2\pi$. The peak magnitude "C" (in Equation 1) of vector R is represented by the length of the vector, i.e. the radius of the circle in FIG. 1; and the instantaneous amplitude of R is represented by its projection onto the real (horizontal) axis. The angle "$\phi$" denotes the phase difference between the transmitted signal R and the reference signal cosine $\theta$.

The first part of the Equation 1 describes the received carrier signal R in terms of its in-phase and quadrature-phase components. The in-phase component (cosine $\theta$) lies on the horizontal axis in FIG. 1 and has a peak amplitude value of "A", which is equal to either +1 or −1, depending on the value of the data being transmitted at that moment. The quadrature-phase component (sine $\theta$) lies along the vertical axis of FIG. 1 and has a peak amplitude value of "B", which is equal to +1 or −1, depending on the value of the data being transmitted. It should be appreciated that the vector addition of the in-phase and quadrature-phase components produces the received carrier signal R in FIG. 1.

For the four-phase type signal, the data bits to be transmitted are divided into, or organized as, pairs of bits (sometimes also called "dibits"). One pair of the data bits is transmitted during each transmission interval, or baud period. The first bit in each data bit pair determines the amplitude value A of the inphase component $\cos \theta$ while the second data bit in each pair determines the amplitude value B of the quadrature-phase component $\sin \theta$.

Since each of the amplitude values A and B is binary in nature, i.e. having a value of either +1 or −1, there are four possible phase angles, or phase values, for the carrier signal R. These phase angles are represented by the four points 2, 4, 6 and 8 shown in FIG. 1. In effect, the first data bit in each dibit pair modulates the in-phase component and the second data bit of each dibit pair modulates the quadrature-phase component of the carrier signal R.

In a fixed reference type of phase modulation system, each of the four possible phase angles for the carrier signal R would represent a different two-bit binary value. However, for a differential phase demodulator, such as that of the instant invention, it is not the actual phase angle at any given moment that determines the two-bit binary value, but rather it is the change in phase angle from one transmission interval (baud period) to the next which determines the two-bit binary value.

The relationship between two-bit binary values being transmitted and the resulting phase angles ($\phi$) which are used to represent such two-bit values is shown in FIG. 2. Thus, for example, if the carrier signal R has the same value in a second baud period as it had in the immediately preceding baud period (zero degree phase change), a two-bit binary data value of (1,1) is represented. Similarly, a +90° phase change from one baud period to the next represents a two-bit binary value of (0,1). The amount of phase change from one baud period to the next, therefore, determines the binary values of the two-bit pair.

Figure 3:
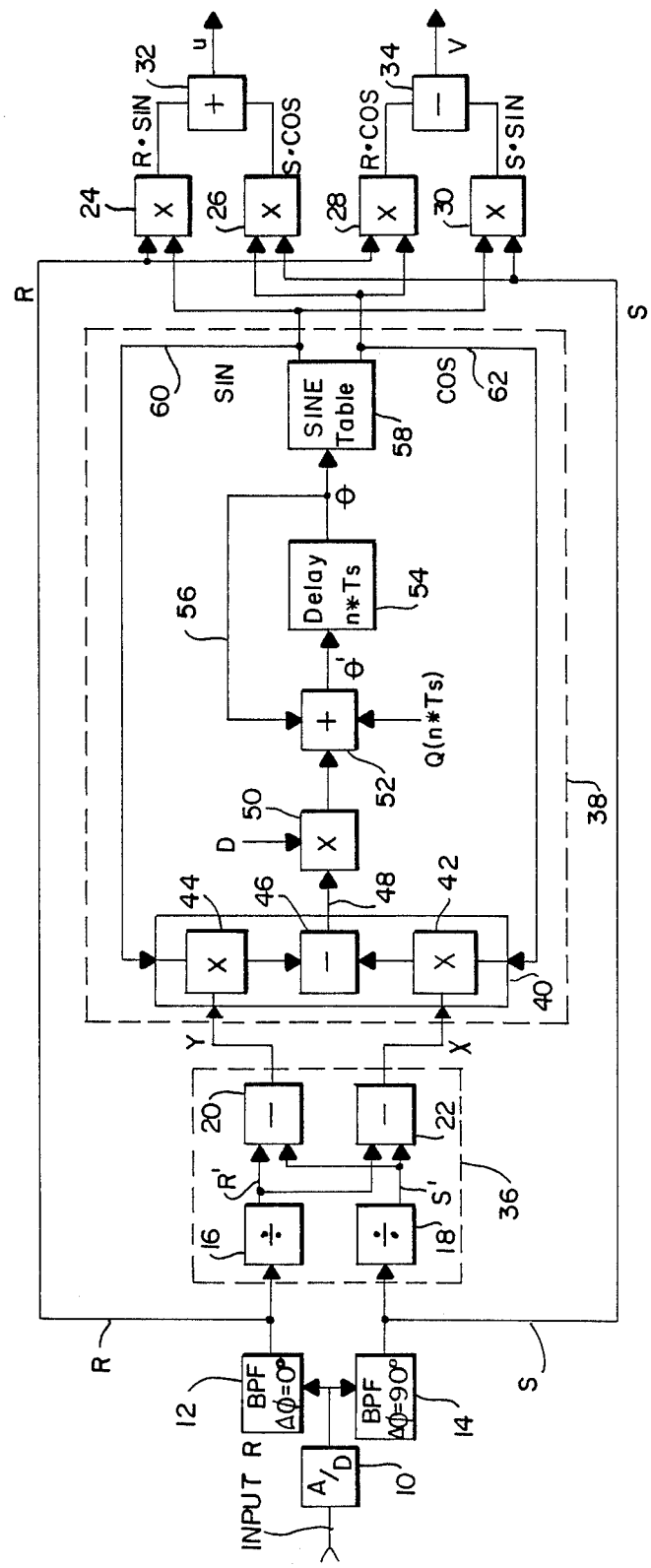
FIG. 3 is a circuit block diagram showing a digital embodiment of a demodulator constructed in accordance with the present invention.

This background having been given, attention is directed to FIG. 3 wherein a digital embodiment of the demodulator of the present invention is shown. Although shown as discrete components in the embodiment of FIG. 3, it should be appreciated that each of these components may also be interpreted or replaced in other embodiments by functions to be performed, for example, as microcodes in a microprocessor.

As shown in FIG. 3, a phase modulated carrier signal R is input to a sampling means, such as an analog-to-digital converter 10. The analog input carrier signal is then converted by analog-to-digital converter 10 into a multi-bit input carrier signal which is transmitted to first and second bandpass filters 12 and 14. As is apparent, analog-to-digital converter 10 periodically samples input carrier signal R and produces for each sample a multi-bit input carrier number representing the amplitude value of the input carrier signal R at the moment of sampling. Thus, there appears at the output of analog-to-digital converter 10 a continuous stream of multi-bit binary numbers, varying in the same manner as the amplitude of the input phase modulator carrier signal R. These discrete digital number values represent the amplitude values at periodically spaced points on the analog waveform.

These bits are fed to digital bandpass filters 12 and 14, which may be of the finite impulse response (FIR) type. Filter 12 in essence filters out extraneous noise and signals that are beyond its bandwidth so that only the original transmitted signal (in the form of a multi-bit signal) is output therefrom as R. The output from filter 14, likewise, is the original transmitted signal, but with a phase shift of 90°. Implementing filter 14 can be accomplished by means of well known sine and cosine transformations for non-integrating phase shifting of the output signal from filter 14 relative to that from filter 12. The output of filter 14 is represented as the signal S.

The respective signals R and S are fed to corresponding dividers 16 and 18 whereby the signals are scaled, with the dividers acting as scalers for halving, for example, the amplitudes of the respective signals. The scaled signals R' and S' are input respectively to a subtracter 20 and an adder 22. From there, instantaneous estimates x and y based on signal R' (the scaled in-phase or cosine component) and signal S' (the scaled quadrature-phase or sine component), respectively, of the input carrier signal are provided. The expressions for these carrier estimates are as follows:

$$x = \text{Sin}(w \cdot n \cdot Ts + P) = \{R(n \cdot Ts) + S(n \cdot Ts)\}/2 \qquad (2)$$

$$y = \text{Cos}(w \cdot n \cdot Ts + P) = \{R(n \cdot Ts) - S(n \cdot Ts)\}/2 \qquad (3)$$

where R and S are the real and imaginary components, i.e. the in-phase and quadrature-phase components, of the received signal; Ts is the sample period; and P represents a phase offset between the actual carrier and the sampling instant nTs.

Although referred to as the instantaneous estimates of the cosine and sine components, it should be appreciated that these estimates are only valid toward the center of the baud period, and are represented respectively by y and x in FIG. 3.

In copending '250 Application the instantaneous estimates x and y are sent directly to multipliers and adders, such as multipliers 24 to 30 and adders 32 and 34.

For the present invention, however, the instantaneous estimates of the in-phase and quadrature-phase of the input carrier signal, output from subtracter 20 and adder 22, which together with dividers 16 and 18, form an estimator circuit 36 enclosed by dotted lines, are fed to a differential carrier recovery mechanism, designated 38.

Specifically, the instantaneous estimates x and y are fed into a computational block 40 which has two multipliers 42 and 44, as well as a subtracter 46.

The x and y components, when they are input to computational block 40, have information regarding only the sine and cosine components of the input carrier signal. In computational block 40, the x and y components are multiplied and combined according to the following equation:

$$\text{Sin}(A - B) = \text{Sin}(A) \cdot \text{Cos}(B) - \text{Cos}(A) \cdot \text{Sin}(B) \qquad (4)$$

where A represents the coherent carrier phase $\theta$ and B represents the phase implied in Equations 2 and 3.

It should be noted that the phase implied in Equations 2 and 3 is never calculated directly via inverse sine and cosine functions since Equation 4 does not require the actual sine and cosine angles. The actual phase error, or phase angle deviation, can be found by taking the sine of the phase error found in Equation 4, and performing an inverse sine function on the value via a table lookup or other possible methods. This process, however, can be avoided by noting that for small angles, the sine of the angle is approximately equal to the magnitude of the angle, in radian measure. Therefore, as the recovered carrier approaches the actual phase of the transmitted carrier, Equation 4 becomes a very good estimate of the actual phase error of the carrier, and thus can be used for adjusting the carrier phase to achieve a very accurate phase synchronization. This phase error is output from computational block 40, via line 48, and fed into a multiplier 50, which acts as a scaler for multiplying the phase error with a multiplication factor D.

The reason for requiring a multiplier 50 is that when the phase error is first output from computational block (for instance when the system is first initiated) it tends to be very large. The invention employs a convergence process so this large phase error can be incrementally decreased, by means of feedback. While Equation 4, at the beginning of its computation, is an invalid expression of the actual phase error, the sign of the output phase error does correspond to the sign of the actual phase error. Hence, by continuously converging the phase error (or phase angle deviation) output from computational block 40, with some ideal numbers, the phase error eventually will be corrected to reflect the actual phase error.

To achieve this feedback, the scaled phase error is sent next to a summer 52 which has as its inputs, besides the scaled phase error signal (from summer 50), a phase angle from an existing sample of the input carrier signal and a phase shift proportional to the differential phase shift between the baud period in which the current sample of the input carrier signal was taken and the baud period in which the existing sample of the input carrier was taken. The phase shift is represented by the expression Q(n·Ts), which is determined from the output of the demodulator, represented by U and V, as shown in FIG. 2. In other words, the expression Q(n·Ts) is the actual differential phase shift detected by the demodulator. The carrier phase $\theta$ may be obtained from a standard first order loop which tracks the phase error as follows:

$$\theta\{(n+1) \cdot Ts\} = \theta(n \cdot Ts) - D \cdot E(n \cdot Ts) + Q(n \cdot Ts) \qquad (5)$$

The actual differential phase shift Q(n·Ts) must be added to the coherent carrier phase in order for the instantaneous estimates X and Y to be in-phase with the recovered carrier. This phase shift is also needed if the demodulator is to generate differential phase shifts directly. Alternately, a carrier signal may be maintained without a phase shift being used in demodulating absolute phase shifted signals, and the running phase shift term, Q, may be kept separately and added to the carrier phase for calculation of the phase error, and then taken away afterwards. In Equation 5, E(n·Ts) represents the phase error signal defined by the following equation:

$$E(n \cdot Ts) = \sin(\theta) \cdot \{R(n \cdot Ts) - S(n \cdot Ts)\}/2 - \cos(\theta) \cdot \{R(n \cdot Ts) + S(n \cdot Ts)\}/2 \qquad (6)$$

where Equation 6 was obtained by the substitution of Equations 2 and 3 into Equation 4.

During the initial convergence, the coherent demodulation process cannot provide a valid output phase shift, Q. Therefore, a "pseudo-coherent" demodulator such as that disclosed in the '250 application is used to provide initial estimates of the phase shifts. After the initiation of the phase convergence, the demodulator can be switched (by either conventional firmware or software, not shown) to a coherent mode in order to obtain better performance.

Continuing with FIG. 3, it can be seen that the phase angle $\theta'$ output from summer 52 is fed to a delay line 54, which may be implemented as a memory. Delay line 54 insures that the new phase angle $\theta'$ output of summer 52 has in fact, as part of its calculation, the existing angle which was provided as an output by delay line 54 and fed back to summer 52, by means of feed back line 56. The separation of new phase angle $\theta'$ and phase angle $\theta$ is by one baud period. Accordingly, as new phase angles $\theta$ are constantly being produced by summer 52, constantly updated phase angle $\theta$ are fed back to summer 52, thereby effecting an averaging circuit for incrementally decreasing the phase error signal from computational block 40.

The phase angle $\theta$ is next fed to a sine table 58 which may be a memory or a collection of memories. Although not limited thereto, for this embodiment, phase angle $\theta$ is assumed to have an eight bit value (since it is in a digital format), and the eight bit value of $\theta$ is used as an address for selecting one of, for example, 256 possible entries (or trigonometric functions) which had previously been stored in sine table 58. Thus, in response to a new phase angle $\theta$, sine table 58 provides a corresponding trigonometric function comprising sine and cosine components to line 60 and 62, respectively, to be fed back to computational block 40.

These sine and cosine components from sine table 58, although being multi-bit numbers, actually do represent the amplitudes of the sine wave and cosine wave of the input carrier signal at the phase angle $\theta$ which has just been provided as an input to sine table 58. These sine and cosine waveforms are coherent, although it must be kept in mind that they only represent one sample of the sine wave and one sample of the cosine wave for their particular baud period; and it takes a plurality of these components to fully represent the sine and cosine wave of the input carrier signal.

The coherent sine and cosine components are next fed to multipliers 24 and 30 and are combined in pairs by adder 32 and subtracter 34 to provide output components U and V, as represented in FIG. 2 and defined by the equations below.

$$U = R \cdot \sin\theta + S \cdot \cos\theta \quad (6)$$

$$V = R \cdot \cos\theta - S \cdot \sin\theta \quad (7)$$

With reference to FIG. 2, it can be seen that U and V represent the amplitude values of the modulation components of the input carrier signal R. For example, when U equals +1 and V equals +1, a zero (0) degree phase shift is represented. If, in the next baud period, a U of −1 and a V of +1 are obtained, then it can be said that a phase shift of +90°, corresponding to an information dibit pair of (0,1) has been detected. The dibit information, of course, relates to the actual data information that is being conveyed by the analog input carrier signal R, which is to be sent for additional processing, as for example to a slicer whose output may be fed back to summer block 52 as Q(n·Ts).

Figure 4:
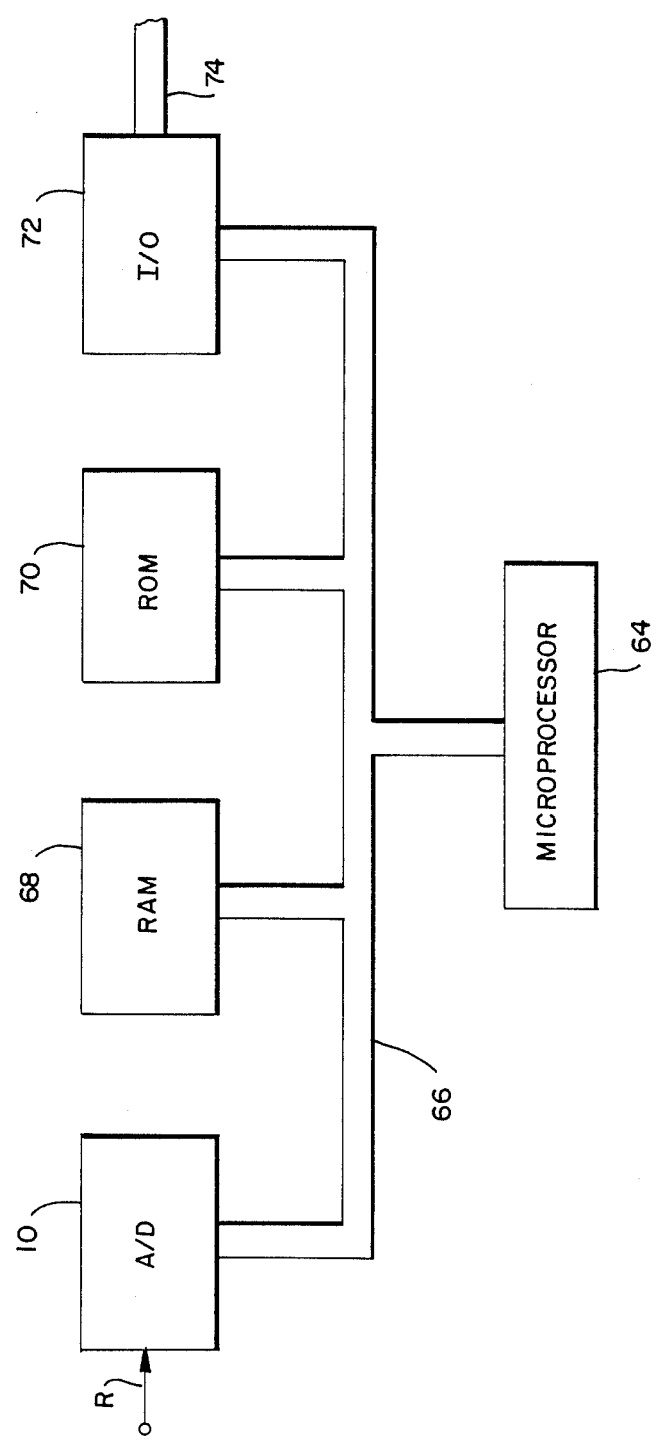
FIG. 4 is a block diagram showing a representative embodiment of the vital processor hardware which may be used to implement or execute the functions of the FIG. 4 digital embodiment.

The discrete components of the FIG. 3 embodiment can be replaced as functions and be performed by certain specialized digital signal processing (DSP) microprocessors, such as that shown in FIG. 4. In the embodiment of FIG. 4 a microprocessor 64 is connected through a combination instruction data bus and address bus 66 to a number of components. The phase modulated input carrier signal R is fed to an analog-to-digital converter such as 10 shown in FIG. 3. For the FIG. 4 embodiment, the steady stream of multi-bit binary numbers are fed from analog-to-digital converter 10 to data bus 66 and stored in sequential storage locations of a random access read-write memory (RAM 68. Also included in the FIG. 4 embodiment are a random-access read only memory (ROM) 70 and an input/output interface mechanism 72, which is connected by another data bus 74 to other input/output interface mechanisms.

Microprocessor 64, in addition to performing other chores, controls the movement of the input carrier multi-bit numbers from analog-to-digital converter 10 to RAM 68. A typical hardware multiplier (not shown) may be added to this type of microprocessor to aid the computation of the different previously discussed equations. The microprocessor 64 executes various program routines representing the different functions performed by the components shown in the FIG. 3 embodiment.

These program routines are permanently stored in ROM 70, which is also coupled to microprocessor 64. For example, a first of these function program routines may be analogous to the function performed by bandpass filter 12. A second function program routine may correspond to the function performed by estimator circuit 36, i.e. the earlier discussed Equations 2 and 3. Similarly, a further function program routine may be used for calculating Equation 4, also performed by computational block 40 of the FIG. 3 embodiment. Of course, it should be appreciated that these different function program routines are performed in a microcode format and the resulting coherent sine and cosine components of the input carrier signal may still be multiplied and added to form demodulator signal numbers which represent the amplitude values of the input carrier signal, as U and V.

Also, a memory may be partitioned in RAM 68 for effecting the delay function of delay block 54, while a portion of memory ROM 70 may be reserved for storing the values representing the ideal sine and cosine components stored in sine table 58 of the FIG. 3 embodiment. The resulting demodulator signal numbers U and V are in turn stored in RAM 68 and are to be used for further signal processing operations such as slicing, decoding, descrambling, and deserialization.

Figure 5:
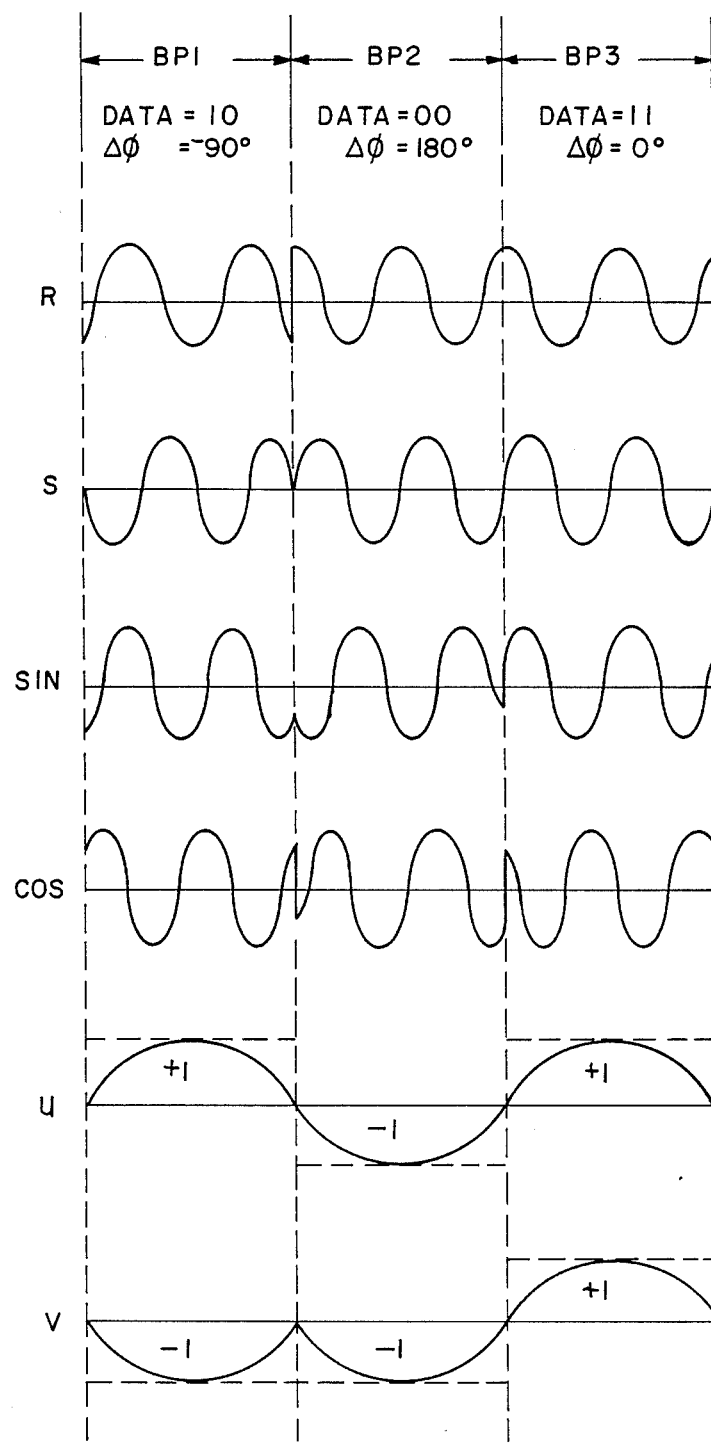
FIG. 5 is a timing diagram showing typical signal waveforms that may occur at different points at the FIG. 3 embodiment.

Referring to FIG. 5, there is shown a plurality of representative signal patterns at the different outputs of the respective components shown in the FIG. 3 embodiment. The waveforms of FIG. 5 represent three continuous baud periods. As is well known, a baud is a unit of signaling speed and refers to the number of times the state or condition of a signal line may change per second. A baud period is the time interval in which the state or condition of the signal is required to remain the same.

As shown, the upper waveform in FIG. 5 represents the input carrier signal at the output of bandpass filter 12; while the second waveform represents the phase shifted signal at the output of bandpass filter 14. As the cosine and sine components of the carrier signal converge, with short term deviations due to noise being eliminated as a result of the converging process, waveforms representing the coherent sine and cosine components of the carrier signal—provided as outputs from sine table 58—are output, as shown by the middle two waveforms of FIG. 5. As illustrated, the sine and cosine waveforms are shifted by 90° in baud period BP 2, from baud period BP 1. Also, even though there is no phase shift between baud period BP 2 and baud period BP 3, there is still a change in the patterns of sine and cosine waveforms for those baud periods based on the phase shift detected in BP 2.

The last two waveform patterns are representative of the amplitude values of the modulation components of the input carrier signal R and, as can be seen at the center of the respective baud periods, U and V do represent the amplitude values of the input carrier signal. For example, for baud period BP 1, U has a +1 value while V has a −1 value, which correspond to a dibit pair information of (1,0). Likewise in baud period BP 2, both U and V have −1 amplitudes. This translates to a dibit pair information of (0,0). As for baud period BP 3, both U and V have +1 amplitudes values, the dibit pair information contact becoming (1,1).

Although the phase change shown in FIG. 2 and discussed so far relates to a change in the phase angle, an absolute phase may also be used. For the absolute phase scenario, instead of 0°, 90°, 180°, and −90°, corresponding 45°, 135°, 225° and 315° are used. The results remain the same.

Figure 6:
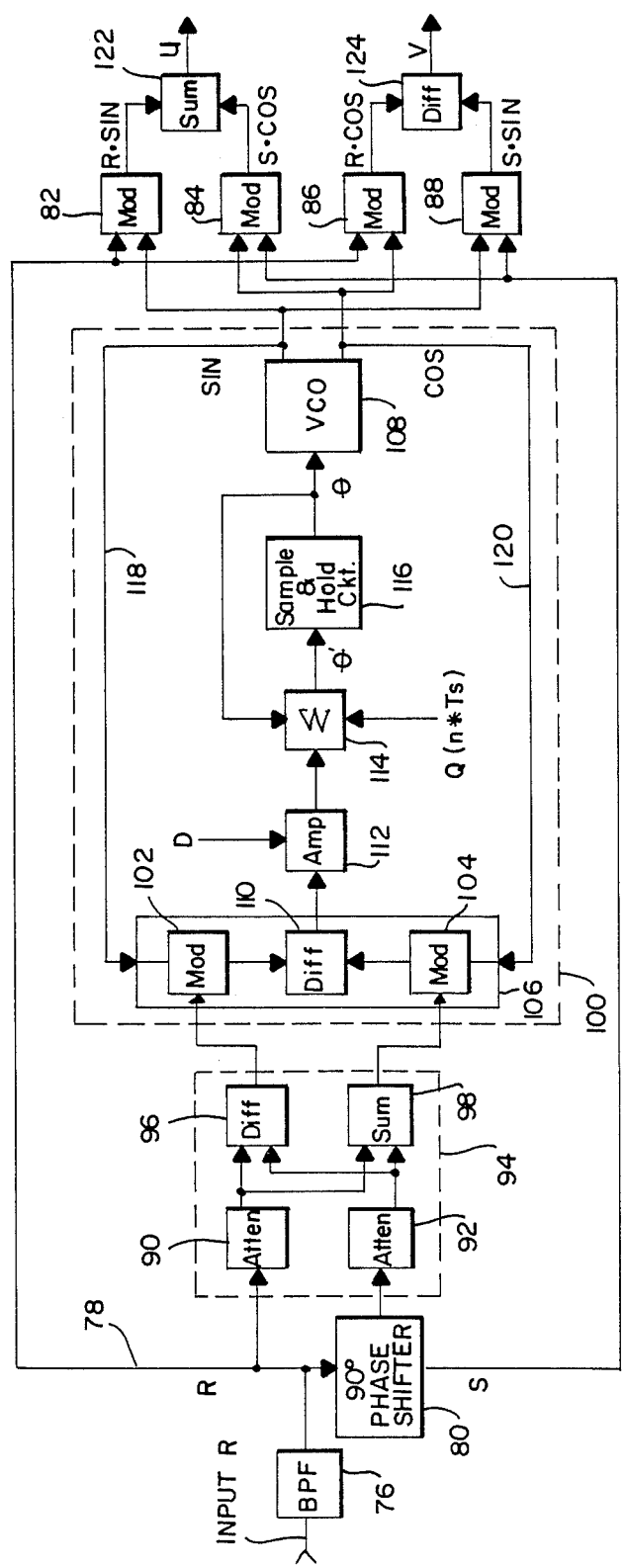
FIG. 6 is a circuit block diagram showing an analog embodiment of a demodulator constructed in accordance with the present invention.

An analog embodiment of the demodulator of the present invention is shown in FIG. 6. For the FIG. 6 embodiment, carrier signal R is fed through a bandpass filter 76 to a signal distribution line 78. A phase shifter 80 phase shifts carrier signal R ninety degrees, for generating the signal S. The R and S signals are fed to modulators 82 to 88 and to respective attenuators 90 and 92 in an estimator circuit 94 (within the dotted block). The carrier signals, after attenuation, are fed to difference circuits 96 and 98. The outputs of the difference circuits are provided to the differential carrier recovery circuit 100, more specifically to modulators 102 and 104 of computational block 106 within circuit 100. As in earlier embodiments, the input signals are modulated by ideal analog signals, provided in this embodiment by a voltage controlled oscillator 108, in response to a predetermined phase angle $\theta$.

By means of a difference circuit 110, the modulated signals from computational block 106 are provided as a phase error signal (or a phase angle deviation) to an amplifier 112, to be multiplied with a constant D. It should be appreciated that D is a fractional constant for assuring that the correction of the phase error signal is only performed in incremental steps, instead of correcting for the entire error in one single step, so that the signal will not become unstable and oscillatory. The thus amplified signal is then summed by a summer 114 with the predetermined phase angle provided by a sample and hold circuit 116 and a differential phase shift, Q(n·Ts), which is proportional to the differential phase shifts between the input carrier signal and the predetermined input carrier signal.

By thus summing the original pre-existing phase angle b and the current phase shift with the error signal, a new phase angle $\theta'$ is calculated and transmitted to sample and hold circuit 116, from whence a new phase angle $\theta$ is calculated. As before, this new phase angle $\theta$ is fed back to summer 114 for further calculations of new phase angles, and to voltage controlled oscillator 108 for providing an input thereto so that ideal cosine and sine waveforms can be output therefrom. The ideal cosine and sine waveforms are fed back by feedback lines 118 and 120, respectively, to computational block 106, thereby effecting a feedback loop for averaging out the phase error signal.

The thus produced sine and cosine waveforms are next fed, in conjunction with carrier signals R and S, to modulators 82 and 88, paired and added or subtracted by the respective sum and difference circuits 122 and 124, for generating coherent demodulated signals U and V. The demodulated signal U represents the in-phase baseband component of the transmitted carrier signal, and for the present invention, represents the binary value of the first data bit in each transmitted dibit pair. The demodulated signal V, on the other hand, represents the quadrature-phase baseband component of the transmitted carrier signal, and is representative of the binary value of the second bit in the transmitted dibit pair. Both waveforms of the demodulated signals U and V are similar to that shown for the U and V waveform patterns in FIG. 5. And as can be readily seen from FIG. 6, the demodulated signals U and V have the same respective expression as equations (6) and (7). By proper substitution, these equations, as was done in the copending '250 application, are representative of the peak amplitude values of the sinusoidal components of the input carrier signal.

Inasmuch as the present invention is subject to many variations, modifications, and changes in detail, it is intended that matter described throughout this Specification and shown in the accompanying drawings be interpreted as illustrative only and not in a limiting sense. Accordingly, it is intended that the invention be limited by the spirit and scope of the appended claims.

We claim:

1. Apparatus for demodulating a phase modulated input carrier signal, comprising:

means for sampling periodically an input carrier signal, converting each sample of the input carrier signal into a multi-bit input carrier signal representative of the input carrier signal at the moment of sampling, and generating instantaneous estimates of in-phase and quadrature-phase components of the current sample of the input carrier signal;

first control means for comparing the instantaneous estimates of the in-phase and quadrature-phase components of the current sample of the input carrier signal with prestored ideal components of an existing sample of the input carrier signal to determine phase angle deviation between the instantaneous estimates of the components and the ideal components; and second control means for summing the phase angle deviation with a phase angle of the existing sample of the input carrier signal and a phase shift proportional to the differential phase shift between the baud period in which the current sample of the input carrier signal was taken and the baud period from which the existing sample of the input carrier signal was taken to effect a new phase angle for deriving a trigonometric function of the input carrier signal corresponding to the new phase angle for comparing with a next sample of the input carrier signal;

thereby incrementally effecting coherently demodulated and substantially ideal in-phase and quadrature-phase components of the input carrier signal.

2. Apparatus according to claim 1, wherein the first control means comprises:

at least two multiplier means each multiplying one of the instantaneous estimates with a corresponding one of the prestored ideal components of the existing input carrier signal sample; and subtracter means for subtracting results from the multiplier means to effect the phase angle deviation.

3. Apparatus according to claim 1, further comprising:

scaler means for multiplying the phase angle deviation with a fractional correction constant.

4. Apparatus according to claim 1, wherein the second control means comprises:

an adder means for summing the phase angle deviation with the phase angle of the existing sample of the input carrier signal and the proportional differential phase shift, and for outputting the new phase angle; and wherein the apparatus further comprises:

a delay means for providing at its output the phase angle of the existing sample of the input carrier signal to the adder means and for receiving at its input the new phase angle output from the adder means, the delay means providing a delay of at least one baud period between the phase angle output therefrom and the new phase angle input thereto.

5. Apparatus according to claim 4, further comprising:
   memory means responsive to the phase angle provided at the output of the delay means for outputting prestored ideal cosine and sine components substantially corresponding to the phase angle output from the delay means;
   whereby the prestored cosine and sine components are fed back to the first control means to be compared with instantaneous estimates of the in-phase and quadrature-phase components of the next sample of the input carrier signal.

6. Apparatus according to claim 5, further comprising:
   multiplier means for multiplying the prestored cosine and sine components of the input carrier signal corresponding to the phase angle output from the delay means with the current sample of the input carrier signal; and
   second adder means for summing results of the multiplier means to provide the coherently demodulated in-phase and quadrature-phase components of the input carrier signal.

7. Apparatus according to claim 1, further comprising:
   means for filtering the multi-bit input carrier signal to generate a filtered input carrier signal having the same amplitude values as the input carrier signal; and
   means for filtering and phase shifting the multi-bit input carrier signal to generate a filtered phase shifted carrier signal having the same amplitude values as the input carrier signal.

8. Apparatus for demodulating a phase modulated carrier signal, comprising:
   means for periodically sampling an input carrier signal, converting each sample of the input carrier signal into a multi-bit input carrier signal representative of the amplitude values of the input carrier signal at the moment of sampling, and generating instantaneous estimates of in-phase and quadrature-phase components for a current sample of the input carrier signal;
   computational means for generating from the instantaneous estimates and cosine and sine components of an existing sample of the input carrier signal a phase error signal;
   delay means for outputting a current phase angle of the input carrier signal;
   summing means for adding to the phase error signal the phase angle of the current sample of the input carrier signal and a phase shift proportional to the differential phase shift between the baud period in which the current sample of the input carrier signal is taken and the baud period from which the existing sample of the input carrier signal was taken to effect a new phase angle;
   memory means for outputting a prestored trigonometric function representative of the current phase angle of the input carrier signal to the computational means as a feedback to incrementally eliminate the phase error signal;
   means for multiplying the trigonometric function from the memory means with the multi-bit input carrier signal and a corresponding phase shifted multi-bit input carrier signal, and adding results from the multiplying means to generate coherently demodulated in-phase and quadrature-phase components of the input carrier signal.

9. Apparatus for demodulating a phase modulated carrier signal, comprising:
   sampling means for periodically sampling an input carrier signal and for converting each sample of the input carrier signal into a multi-bit input carrier signal representative of the amplitude values of the input carrier signal at the moment of sampling;
   filter means for filtering the multi-bit input carrier signal to generate a filtered carrier signal having the same amplitude values as the input carrier signal;
   filter and phase shift means for filtering and phase shifting the multi-bit input carrier signal to generate a filtered phase shifted carrier signal having the same amplitude values as the input carrier signal;
   estimator means for generating instantaneous estimates of components of the input carrier signal from the filtered carrier signals;
   computational means for generating from the instantaneous carrier signal estimates a phase error signal;
   delay means for outputting a current phase angle of the input carrier signal having a corresponding angular data binary number;
   summing means for adding to the phase error signal the current phase angle and a phase shift proportional to the differential phase shift between the baud period in which the sample of the input carrier signal is taken and the baud period from which an earlier sample of the input carrier signal was taken to effect a new phase angle to be fed to the delay means; and
   memory means for accepting the angular data binary number representative of the current phase angle from the delay means and for providing, in response thereto, cosine and sine components of the current phase angle, the components being fed back to the computational means for combining with the instantaneous carrier signal estimates to incrementally eliminate the phase error signal, thereby effecting coherent demodulation of the phase modulated carrier signal.

10. Apparatus for demodulating a phase modulated carrier signal, comprising:
    means for periodically sampling an input carrier signal, converting each sample of the input carrier signal into a multi-bit input carrier signal representative of the amplitude of the input carrier signal at the moment of sampling, and generating instantaneous estimates of components of the input carrier signal;
    computational means for generating from the instantaneous carrier signal estimates a phase error signal;
    summing means for adding to the phase error signal a current phase angle and a phase shift proportional to the differential phase shift between the baud period in which the sample of the input carrier signal is taken and the baud period from which an earlier sample of the input carrier signal was taken to effect a new phase angle;
    memory means for accepting the current phase angle and for providing, in response thereto, a trigonometric function thereof, the components being fed back to the computational means for combining with the instantaneous carrier signal estimates to incrementally eliminate the phase error signal, thereby effecting coherent demodulation of the phase modulated carrier signal.

11. Apparatus for demodulating a phase modulated carrier signal, comprising:
   phase shift means responsive to an input carrier signal for producing a phase shifted carrier signal;
   estimator means responsive to the input carrier signal and the phase shifted carrier signal for generating instantaneous estimates of in-phase and quadrature-phase components of the input carrier signal;
   computational means for comparing the instantaneous estimates of the in-phase and quadrature-phase components of the input carrier signal with predetermined ideal components of an existing input carrier signal to determine phase angle deviation therebetween;
   summing means for adding to the phase angle deviation a predetermined phase angle of the existing input carrier signal and a phase shift which is proportional to the differential phase shift between the input carrier signal and the existing input carrier signal to produce a new phase angle to be used as an input to update the predetermined ideal components;
   whereby the phase angle deviation between the instantaneous estimates of the in-phase and quadrature-phase components of the input carrier signal and the ideal components is incrementally eliminated as the phase angle deviation determined by the computational means incrementally decreases.

12. Apparatus according to claim 11, further comprising:
   amplifier means for providing a correction gain to the phase angle deviation.

13. Apparatus according to claim 11, further comprising:
   delay means for providing at least one baud period between the new phase angle to be used to update the predetermined ideal components and the previously determined phase angle; and
   storage means responsive to the new phase angle for producing prestored cosine and sine components corresponding thereto.

14. Apparatus according to claim 13, wherein the delay means comprises a sample and hold circuit; and
   wherein the storage means comprises a voltage controlled oscillator.

15. Apparatus according to claim 11, further comprising:
   modulating means for summing the updated ideal components with the input carrier signal and the phase shifted carrier signal; and
   summing and difference circuits for combining the summed results from the modulating means to produce coherent demodulated in-phase and quadrature-phase components of the input carrier signal.

16. Apparatus for demodulating a phase modulated input carrier signal, comprising:
   means for sampling periodically the input carrier signal, converting each sample of the input carrier signal into a multi-bit input carrier signal representative of the input carrier signal at the moment of sampling, and generating instantaneous estimates of in-phase and quadrature-phase components of the current sample of the input carrier signal;
   first control means for comparing the instantaneous estimates of the in-phase and quadrature-phase components of the current sample of the input carrier signal with prestored ideal components of an existing sample of the input carrier signal to determine phase angle deviation between the instantaneous estimates of the components and the ideal components, the first control means including:
      at least two multiplier means each multiplying one of the instantaneous estimates with a corresponding one of the prestored ideal components of the existing input carrier signal sample;
      subtracter means for subtracting results from the multiplier means to effect the phase angle deviation;
   second control means for summing the phase angle deviation with a phase angle of the existing sample of the input carrier signal and a phase shift proportional to the differential phase shift between the baud period in which the current sample of the input carrier signal was taken and the baud period from which the existing sample of the input carrier signal was taken to effect a new phase angle for deriving a trigonometric function of the input carrier signal corresponding to the new phase angle for comparing with a next sample of the input carrier signal, the second control means including:
      an adder means for summing the phase angle deviation with the phase angle of the existing sample of the input carrier signal and the proportional differential phase shift, and for outputting the new phase angle;
   scaler means for multiplying the phase angle deviation with a fractional correction constant;
   a delay means for providing at its output the phase angle of the existing sample of the input carrier signal to the adder means and for receiving at its input the new phase angle output from the adder means, the delay means providing a delay of at least one baud period between the phase angle output therefrom and the new phase angle input thereto;
   thereby incrementally effecting coherently demodulated and substantially ideal in-phase and quadrature-phase components of the input carrier signal.

17. Apparatus according to claim 16, further comprising:
   memory means responsive to the phase angle provided at the output of the delay means for outputting prestored ideal cosine and sine components substantially corresponding to the phase angle output from the delay means;
   whereby the prestored cosine and sine components are fed back to the first control means to be compared with instantaneous estimates of the in-phase and quadrature-phase components of the next sample of the input carrier signal.

18. Apparatus according to claim 17, further comprising:
   multiplier means for multiplying the prestored cosine and sine components of the input carrier signal corresponding to the phase angle output from the delay means with the current sample of the input carrier signal; and
   second adder means for summing results of the multiplier means to provide the coherently demodulated in-phase and quadrature-phase components of the input carrier signal.

19. Apparatus according to claim 16, further comprising:
   means for filtering the multi-bit input carrier signal to generate a filtered input carrier signal having the same amplitude values as the input carrier signal; and
   means for filtering and phase shifting the multi-bit input carrier signal to generate a filtered phase shifted carrier signal having the same amplitude values as the input carrier signal.

20. A method of demodulating a phase modulated input carrier signal, comprising the steps of:
   sampling periodically the input carrier signal, converting each sample of the input carrier signal into a multi-bit input carrier signal representative of the input carrier signal at the moment of sampling, and generating instantaneous estimates of in-phase and quadrature-phase components of the current sample of the input carrier signal;
   comparing the instantaneous estimates of the in-phase and quadrature-phase components of the current sample of the input carrier signal with prestored ideal components of an existing sample of the input carrier signal to determine phase angle deviation between the instantaneous estimates of the components and the ideal components;
   summing the phase angle deviation with a phase angle of the existing sample of the input carrier signal and a phase shift proportional to the differential phase shift between the baud period in which the current sample of the input carrier signal was taken and the baud period from which the existing sample of the input carrier signal was taken to effect a new phase angle for deriving a trigonometric function of the input carrier signal corresponding to the new phase angle for comparing with a next sample of the input carrier signal;
   thereby incrementally effecting coherently demodulated and substantially ideal in-phase and quadrature-phase components of the input carrier signal.

21. Method according to claim 20, wherein the comparing step further comprises the steps of:
   multiplying one of the instantaneous estimates with a corresponding one of the prestored ideal components of the existing input carrier signal sample; and
   subtracting results from the multiplier means to effect the phase angle deviation.

22. Method according to claim 20, wherein the summing step further comprises the steps of:
   summing the phase angle deviation with the phase angle of the existing sample of the input carrier signal and the proportional differential phase shift for outputting the new phase angle.

* * * * *